(12) United States Patent
Shah

(10) Patent No.: US 7,752,268 B2
(45) Date of Patent: Jul. 6, 2010

(54) METHOD AND SYSTEM FOR PRESENCE STATE ASSIGNMENT BASED ON SCHEDULE INFORMATION IN AN INSTANT MESSAGING SYSTEM

(75) Inventor: Rahul L. Shah, Mumbai (IN)

(73) Assignee: Oracle America, Inc., Redwood City, CA (US)

( * ) Notice: Subject to any disclaimer, the term of this patent is extended or adjusted under 35 U.S.C. 154(b) by 904 days.

(21) Appl. No.: 10/670,549

(22) Filed: Sep. 25, 2003

(65) Prior Publication Data
US 2005/0071426 A1    Mar. 31, 2005

(51) Int. Cl.
G06F 15/16    (2006.01)
(52) U.S. Cl. .................. 709/206; 709/207; 709/219
(58) Field of Classification Search ............... 709/206, 709/207, 219
See application file for complete search history.

(56) References Cited

U.S. PATENT DOCUMENTS

| | | | |
|---|---|---|---|
| 4,591,840 A * | 5/1986 | Curtis et al. | 345/156 |
| 5,936,625 A * | 8/1999 | Kahl et al. | 715/775 |
| 6,687,495 B2 | 2/2004 | Bhatia et al. | |
| 6,728,530 B1 * | 4/2004 | Heinonen et al. | 455/414.1 |
| 6,868,544 B2 | 3/2005 | Dalal et al. | |
| 6,988,132 B2 | 1/2006 | Horvistz | |
| 6,993,327 B2 | 1/2006 | Mathis | |
| 7,035,865 B2 | 4/2006 | Doss et al. | |
| 7,092,952 B1 * | 8/2006 | Wilens | 707/100 |
| 7,120,424 B1 * | 10/2006 | Coan et al. | 455/414.1 |
| 7,383,291 B2 * | 6/2008 | Guiheneuf et al. | 707/203 |
| 2002/0035605 A1 * | 3/2002 | McDowell et al. | 709/206 |
| 2002/0065894 A1 | 5/2002 | Dalal et al. | |
| 2003/0104819 A1 * | 6/2003 | Knauerhase et al. | 455/456 |
| 2005/0037741 A1 * | 2/2005 | Gilbert | 455/414.1 |
| 2005/0044143 A1 * | 2/2005 | Zimmermann et al. | 709/204 |
| 2008/0065461 A1 * | 3/2008 | Doss et al. | 705/9 |

(Continued)

FOREIGN PATENT DOCUMENTS

WO    WO01/45368    6/2001

(Continued)

OTHER PUBLICATIONS

Day, et al., "RFC 2778: A Model for Presence and Instant Messaging," Feb. 2000, http://www.ietf.org/rfc/rfc2778.txt.

(Continued)

Primary Examiner—Nathan Flynn
Assistant Examiner—Mohamed Wasel
(74) Attorney, Agent, or Firm—Robert C Kowert; Meyertons, Hood, Kivlin, Kowert & Goetzel, P.C.

(57) ABSTRACT

A method and system for presence state assignment based on schedule information in an instant messenger system. In one embodiment, the method may include storing schedule information corresponding to a given user, where the schedule information is indicative of an activity status of the given user at a given time. The method may further include querying the schedule information, and if a current presence state of an instant messenger does not correspond to the activity status indicated by the schedule information, assigning a different presence state that corresponds to the activity status in response to the querying, where the current presence state and the different presence state each correspond to the given user.

30 Claims, 7 Drawing Sheets

U.S. PATENT DOCUMENTS

2008/0113673 A1* 5/2008 Brown et al. ............. 455/456.1

FOREIGN PATENT DOCUMENTS

| WO | WO01/69387 | 9/2001 |
|---|---|---|
| WO | WO 0169387 A2 * | 9/2001 |
| WO | WO03/032613 | 4/2003 |

OTHER PUBLICATIONS

Day, et al., "RFC 2779: Instant Messaging/Presence Protocol Requirements," Feb. 2000, http://www.ietf.org/rfc/rfc2779.txt.

* cited by examiner

METHOD AND SYSTEM FOR PRESENCE STATE ASSIGNMENT BASED ON SCHEDULE INFORMATION IN AN INSTANT MESSAGING SYSTEM

BACKGROUND OF THE INVENTION

1. Field of the Invention

This invention relates to instant messaging systems and, more particularly, to instant messaging presence state information.

2. Description of the Related Art

Instant messaging systems, such as SunONE Instant Messenger, AOL Instant Messenger (AIM), and Yahoo! Messenger, for example, may provide a convenient method for users of a computer system to interact with one another in various different ways. Generally, instant messaging systems provide the capability for several computer system users to "chat" or exchange messages nearly instantaneously, such that when one user enters and sends a message, another user sees that message soon thereafter. In many embodiments, instant messaging systems may provide users engaging in such a chat the ability to see their messages interspersed with those of other respondents and displayed in the order the messages were exchanged. Instant messaging systems may thus provide a context for dialogue when other modes of communication are inaccessible or inconvenient.

In some embodiments, instant messaging systems may provide other features in addition to a chat operation. For example, a given instant messaging system may provide for users to establish static virtual "conference rooms," which may permit users to engage in chats with whoever happens to be in the virtual conference room at a given time. Such a feature may, for example, enable users situated at different locations to conduct group meetings. Additionally, a given instant messaging system may enable users to send alerts to one another. In one embodiment an instant messaging alert may be used to convey information when no response is desired, such as a meeting reminder, for example. These and other types of instant messaging operations are discussed in greater detail below.

In an instant messaging environment, some indication of whether or not a given user is available to engage in instant messaging operations may be useful. For example, users may temporarily step away from their desks, attend meetings, or leave the office. Even when physically present, users may be busy with other tasks and unavailable for instant messaging operations. Consequently, in some instant messaging system embodiments an instant messaging presence state is implemented. In one embodiment, such a presence state may include a status indication, such as a text message that a user selects from a list or enters directly. Changes to a user's presence state may then become visible to other users of the system. For example, if a given user is busy with other tasks, he or she may select a "busy" instant messenger presence state, which may indicate a busy status to other users.

The presence state may effectively indicate a given user's presence status to other users of a system. However, a user may fail to select the presence state that actually corresponds to that user's status at a given time. For example, a given user may be busy with other tasks but forget to select a busy presence state. Thus, other users may potentially interrupt the given user with requests to chat or other instant messenger operations. Likewise, if a given user indicates an availability to chat but is actually away at an appointment, other users may mistakenly assume the given user is in fact available.

Even if a user selects a busy presence state to notify other users of a desire not to be disturbed, this may not actually prevent other users from attempting to initiate instant messenger operations with the busy user. For example, another user could simply ignore the busy presence state and send alerts, requests to chat, or other operations to the busy user. Additionally, changes in presence state may not result in relevant instant messenger operations being performed. For example, a busy user may wish to chat with another user once he is no longer busy, but may forget this fact by the time he changes his presence state to reflect an idle status.

SUMMARY OF THE INVENTION

Various embodiments of a method and system for presence state assignment based on schedule information in an instant messenger system are disclosed. In one embodiment, the method may include storing schedule information corresponding to a given user, where the schedule information is indicative of an activity status of the given user at a given time. The method may further include querying the schedule information, and if a current presence state of an instant messenger does not correspond to the activity status indicated by the schedule information, assigning a different presence state that corresponds to the activity status in response to the querying, where the current presence state and the different presence state each correspond to the given user.

In one embodiment, the system may include a computer system, an instant messenger software module configured to execute on the computer system, and a calendar application software module configured to store schedule information corresponding to a given user, where the schedule information is indicative of an activity status of the given user at a given time. The calendar application software module may be further configured to respond to queries of said schedule information from the instant messenger software module. The instant messenger software module may be further configured to query the schedule information, and if a current presence state of the instant messenger software module does not correspond to the activity status indicated by the schedule information, to assign a different presence state that corresponds to the activity status in response to the querying, wherein the current presence state and the different presence state each correspond to the given user.

Figure 1:
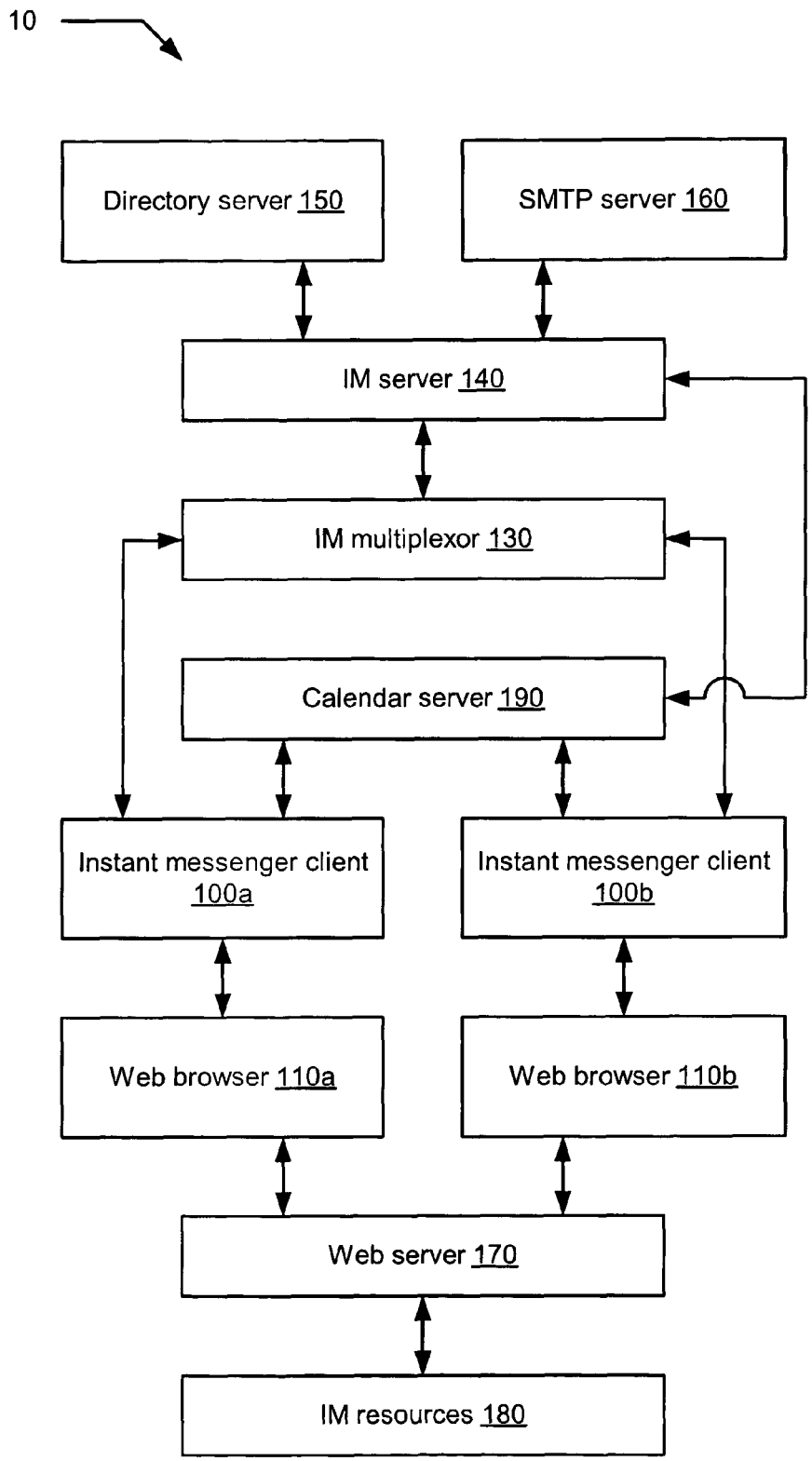
FIG. 1 is a block diagram illustrating one embodiment of an instant messaging software system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Instant Messaging System Software and Hardware

Turning now to FIG. 1, a block diagram illustrating one embodiment of an instant messaging software system is shown. In the illustrated embodiment, instant messenger (IM) system 10 includes the following software modules: instant messenger clients 100a and 100b, web browsers 110a and 110b, IM multiplexor 130, IM server 140, directory server 150, SMTP server 160, web server 170, IM resources 180, and calendar server 190. Arrows interconnecting the software modules illustrated in FIG. 1 represent communication paths between the interconnected modules, through which data and control information may be passed.

Communication along the illustrated paths may be implemented using a variety of software techniques. For example, in one embodiment, software function calls such as may be defined in an application programming interface (API) may be used to implement communication between software modules. In another embodiment, software modules may communicate by passing messages, for example directly through a commonly-defined message passing port interface or indirectly through reading and writing shared memory. In still another embodiment, software modules may communicate over a network infrastructure using a protocol such as hypertext transfer protocol (HTTP), file transfer protocol (FTP), or transmission control protocol (TCP), for example. The function of specific interconnections among software modules illustrated in IM system 10 is described in greater detail below in conjunction with the descriptions of the relevant modules.

In one embodiment, instant messaging may provide a mode of communication among two or more users of a computer system that minimally provides the capability for users to exchange text messages in real time, which messages may be referred to as instant messages. In one embodiment, instant messaging may further allow users exchanging instant messages to view all instant messages exchanged (including a user's own entered instant messages) in the order they were exchanged. Capabilities provided by instant messaging may be referred to generically herein as instant messaging operations, and the specific capability just described may be referred to herein as a chat operation. Depending on implementation, instant messaging may include numerous other instant messaging operations as described in detail below. In one embodiment, an instant messenger may comprise a software application or a hardware device with which a given user interacts to engage in instant messaging operations. An instant messenger may also be referred to herein as an instant messenger client. In one embodiment, an instant messaging software system may comprise one or more software modules configured to implement instant messaging, as described in further detail below.

Instant Messenger Client and Operations

Instant messenger (IM) clients 100a and 100b, which may be referred to individually or collectively herein as IM client 100, may be configured to provide access to instant messaging operations for one or more users of IM system 10. Although only two instant messenger clients are illustrated in FIG. 1, it is contemplated that IM system 10 may include an arbitrary number of IM clients 100. In one embodiment, IM client 100 may provide access to instant messaging operations that may include a chat operation, an alert operation, a polling operation, and a news channel operation, although in other embodiments it is contemplated that different kinds and combinations of instant messaging operations may be provided. General descriptions of the operation of the chat, alert, polling and news channel operations from the perspective of IM client 100 follow. Greater detail regarding the operation of the other modules of IM system 10 is provided in subsequent sections.

In one embodiment, the chat operation may provide a real-time conversation capability among users of IM system 10. For example, two given users A and B may log on and be authenticated by IM system 10 (such as by providing a user ID and a password) and may begin using IM clients 100a and 100b, respectively. In one embodiment, authentication of users and authorization of users to access resources provided by IM system 10 may be performed by IM server 140, which may be configured to query directory server 150 to authenticate the identities of users A and B and determine their privileges within IM system 10. IM client 100 may provide access for authenticated and authorized users to a directory service and may indicate to user A that user B is online and vice versa. For example, in one embodiment, IM client 100 may enable a given user to create customized lists of users and may display the status of each user specified in the list whenever the given user logs on to IM system 10 or requests such a display. IM client 100 may also provide a procedure for a given user to specifically query for the online status of another user, such as by providing that user's user ID.

Once user A has determined that user B is online, user A may direct IM client 100a to initiate a chat operation (also referred to herein as a chat session) with user B. In one embodiment, user A may then enter text via IM client 100a that may be forwarded to and displayed via IM client 100b for user B to read. User B may then enter response text via IM client 100b that may be forwarded to and displayed via IM client 100a for user A to read, thereby providing the aforementioned real-time conversation capability. Although the preceding description of chat session functionality includes only two participants, it is contemplated that a chat session may include an arbitrary number of participants. Also, in some embodiments, text may be sent from one IM client 100 to the IM clients 100 of other chat session participants immediately upon entry. In other embodiments, text may be held and displayed at the IM client 100 at which it was entered until the user directs it to be sent, such as by entering a carriage return or invoking a "send" feature. Such an embodiment of IM client 100 may thereby enable chat session users to edit their input prior to making it visible to other participants.

In addition to indicating whether or not a given user is online within IM system 10, IM client 100 may implement and display a presence state for a user. In one embodiment, presence state may comprise a state indicative of the presence or absence of a given instant messaging user, as well as any additional available information about that's user's current activity. In some embodiments, presence state may include textual information such as "online," "busy," "away," "be right back," "on the phone," "out to lunch," and "gone home." In some embodiments, other default presence states may be defined and users may be able to create new presence states. It is also contemplated that in some embodiments, a presence state may include numeric codes or encrypted values.

In one embodiment, a given user may manually select a particular presence state value from a menu, list, or other selection mechanism, and the selected presence state may then be displayed to other users of IM system 10 whenever they query the status of the given user. For example, user A may select the "away" presence state in IM client 100a. If user A is in user B's customized list of users of IM system 10, IM client 100b may show the "away" presence state associated with user A whenever user B views the list. Alternatively, IM client 100b may show the "away" presence state associated with user A if user B specifically queries the status of user A within IM system 10, such as by providing user A's user ID. User B may then utilize the presence state of user A in determining whether to initiate or respond a chat session request with user A. As described in greater detail below, the presence state of a given user may change in response to events other than manual selection by that user, and changes in presence state may result in actions beyond simply displaying that user's presence state to other users of IM system 10.

In some circumstances, user A of IM system 10 may wish to communicate information to user B without expecting a response from user B. Rather than attempt to establish a chat session in this case, user A may send an alert to user B using an alert operation. In one embodiment, the alert operation may provide a unidirectional communication capability among users of IM system 10. For example, in a manner similar to that illustrated in the exemplary chat session described above, user A may determine whether user B is online. After making this determination, user A may enter the information to be sent to user B via IM client 100a, and may then direct IM client 100a to send an alert to user B. Alternatively, user A may send the alert without determining whether user B is online, whereupon IM system 10 may queue the alert for later delivery to user B if user B is currently offline. If user B is online, upon receiving the information in the alert IM client 100b may then display the alert for user B. For example, in some embodiments IM client 100b may generate a visual and/or audible indication that an alert has arrived and may cause the information content of the alert to be displayed on a video display device or played audibly via an audio system. Once user B has acknowledged the alert, IM client 100b may notify IM client 100a, which may in turn display to user A a notification (such as a text message, for example) that user B has received and acknowledged the alert.

In some embodiments, alerts may originate from sources other than individual users of IM system 10. For example, a given user may customize an email application to send an alert to the IM client 100 of that user whenever an email message arrives for that user. Alternatively, a calendar application may be configured to send an alert when particular calendar appointments come due.

A polling operation may provide a mechanism for a given user to solicit responses from other users of IM system 10 without establishing a chat session with each solicited user. In one embodiment, the polling operation may provide a bidirectional question-and-response communication capability among users of IM system 10, wherein a given user (referred to herein as the respondent) may formulate a question to be directed to other users (referred to herein as the recipients) along with a list of possible responses to the question. Upon receiving the poll, each recipient may select a particular response and send the selected response to the respondent. In one embodiment, the polling operation may support "write-in" responses that may allow recipients to specify a response other than those listed in the poll.

For example, the respondent may enter a polling question as well as a list of possible responses via IM client 100a, and may further select the recipients from the users of IM system 10 by using a directory service or a predefined list of users as described above. The respondent may then direct IM client 100a to send the poll to the specified recipients. The recipients may receive the poll via their respective IM clients 100, which may display the polling question and responses in a manner similar to displaying an alert as described above. Each recipient may then select a response and direct his or her respective IM client 100 to send the selected response to the respondent. IM client 100a may receive and display responses to the respondent, and may also indicate which recipients have and have not responded to the poll.

A news channel operation may provide a mechanism for a given user to disseminate information to other users of IM system 10 without establishing a chat session with each other user or sending an alert or poll to each other user. In one embodiment, the news channel operation may provide a forum, referred to herein as a news channel, for users to post and read information. In such an embodiment, a given news channel may be static, in that information posted to it may remain available to be read until it is explicitly deleted or until it expires. A news channel may thereby provide an asynchronous communication mechanism in which users may exchange information without simultaneously actively using IM system 10. As an example, a given user may use IM client 100a to compose information, such as text information, to be posted to a particular news channel specified by the user. That user may then direct IM client 100a to post the information to the specified news channel and may optionally specify a date and/or time when the posting should expire. Other users may subsequently direct their respective IM clients 100 to view the contents of the particular news channel and may compose and post their responses or other information.

In some embodiments of IM system 10, some instant messaging operations described above as well as some sub-operations of those operations may not be available to all users of the system. For example, in one embodiment, certain news channels may only be accessed for reading by a specific group of users, and only a subset of that group may be allowed to post content to those news channels. Similarly, some users may be restricted from establishing chat sessions or sending alerts to other users. In such embodiments, privileges to use various features and operations of IM system 10 may be assigned to individual users. In one embodiment, IM server 140 (described below) may be configured to manage user privileges and control access to features and operations of IM system 10 based on those privileges.

Instant Messaging System Software Modules

While in the above description of instant messaging operations IM client 100 may provide the most user-visible portion of these operations, in the embodiment of IM system 10 illustrated in FIG. 1 numerous software modules may interact to support instant messaging functionality.

In the illustrated embodiment, IM clients 100a and 100b are configured as web-based clients associated with a respective web browser 100a or 100b rather than as standalone applications, although as noted below, in alternative embodiments IM clients 100a and 100b may be configured as standalone applications. A user may begin using a given web-based IM client 100 by navigating to a particular uniform resource locator (URL) identifying a path to the IM client software from within a corresponding web browser 110. In one embodiment, web browser 110 may be a software application configured for accessing documents or applications over a network via a protocol such as hypertext transfer protocol (HTTP). For example, web browser 110 may be a software application such as Netscape Navigator™ or Netscape Communicator™, although in other embodiments different browser application software may be used.

Once a user specifies the IM client URL, for example by typing the URL into the appropriate input field of web browser 110, in the illustrated embodiment web browser 110 requests and downloads IM resources 180 via web server 170. In one embodiment, web server 170 may be a software application configured to deliver documents or applications to a web browser in response to a request. For example, web server 170 may be a software application such as Sun ONE Web Server, although in other embodiments different web server application software may be used. In the illustrated embodiment, IM resources 180 may include executable application code files, such as Java files, for example. When downloaded by and executed within web browser 110, IM resources 180 may provide the software functionality of IM client 100. For example, execution of IM resources 180 may cause an IM user interface to be displayed within web browser 110 or in a window separate from web browser 100. It is noted that in some embodiments, web browser 110, web server 170, and IM resources 180 may all be located on and operate from a single computing device. In other embodiments, some or all of these software modules may be located on and operate from separate computing devices interconnected via a communication network such as an Ethernet network, for example.

Various IM clients 100 may communicate with one another to perform the chat, alert, poll, and/or news channel operations described above, as well as any other instant messaging operations that may be implemented in a particular embodiment. In the illustrated embodiment, communication among IM clients may take place through IM multiplexor 130 and IM server 140. In one embodiment, IM server 140 may be a software application configured to control IM privileges and security, for example by limiting access to certain instant messaging operations by certain users of IM system 10. IM server 140 may also store presence state data associated with each user of IM system 10 and make the presence state data visible to users that request it.

Additionally, IM server 140 may be configured to support the execution of the various instant messaging operations by IM clients 100. For example, IM server 140 may establish chat operations by responding to a request to initiate a chat operation from one IM client 100, locating the appropriate IM client 100 associated with the target user of the chat operation request, and notifying the latter IM client 100 of the chat operation request. In some embodiments, IM server 140 may be configured to mediate the subsequent exchange of data among the IM clients 100 participating in the chat session, while in other embodiments IM server 140 may be configured only to initiate the chat session, whereupon IM clients 100 may then directly communicate without server intervention. IM server 140 may also be configured to receive alert and poll operations originating from IM clients 100 and route such operations to the IM clients 100 of the appropriate users. Further, IM server 140 may be configured to receive and store messages destined for the various news channels that have been configured in IM system 10 and to deliver the contents of those news channels to IM clients 100 of requesting users.

In a given embodiment of IM system 10, there may be numerous IM clients 100 that collectively generate numerous instant messaging operations to be serviced by a given IM server 140. In some embodiments of IM system 10, multiple instances of IM server 140 may be employed to ensure adequate system performance. Additionally, IM multiplexor 130 may be configured to consolidate multiple requests from IM clients 100 into a single communication stream such as a transmission control protocol (TCP) stream, which may then be sent to a given IM server 140 over a single communication port. Owing to the fact that in some embodiments, numerous IM clients 100 may be operating on numerous different computing devices, each of which may be connected to an IM server 140 via a communication network, interposing IM multiplexor 130 between IM clients 100 and a given IM server 140 may increase system performance by reducing the number of individual communication ports a given IM server 140 may need to service.

Prior to allowing an individual user to begin performing instant messaging operations via a given IM client 100, IM server 140 may be configured to authenticate the user and to determine what privileges of IM system 10 operation that user may be entitled to. In the illustrated embodiment, IM server 140 may be configured to authenticate a given user by receiving a user ID and password from the IM client 100 associated with a user seeking to initiate instant messaging operations. IM server 140 may then consult a directory server 150 to determine whether the user ID and password combination is valid. In one embodiment directory server 150 may be a software application configured to store data regarding authorized users of IM system 10, such as a user ID, full name, and contact information for a given user. In some embodiments, directory server 150 may implement the lightweight directory access protocol (LDAP), whereas in other embodiments directory server 150 may store user data using a different protocol. If directory server 150 confirms the validity of the user ID and password supplied by IM server 140, IM server 140 may update the presence status of the user in question to reflect an online status and allow the user to proceed to initiate instant messaging operations.

In the illustrated embodiment of IM system 10, IM server 140 may be configured to send email to users who are offline when an alert is directed to them. Specifically, IM server 140 may communicate with SMTP server 160 to provide the content and addressee information for such emails. SMTP server 160 may be a software application configured to process the sending and receiving of email. In one embodiment, SMTP server 160 may implement the simple mail transfer protocol (SMTP), although in other embodiments other protocols may be employed. In some embodiments of IM system 10, the arrival of email destined for a given online user may trigger an instant messaging alert operation to that user. In such embodiments, IM server 140 may be configured to receive incoming email arrival information and to direct alerts to the appropriate IM clients 100 in response to such information.

In the illustrated embodiment, IM system 10 includes calendar server 190. Calendar server 190 may be a software application configured to maintain schedule information for a given user of IM system 10, where such schedule information may indicate an activity status of a given user at a given time of day. In one embodiment, calendar server 190 may be compliant with the Internet Calendaring and Scheduling Core Object Specification standard (RFC 2445), while in other embodiments, other standards may be employed. Schedule information may include the beginning and ending times of various events such as meetings, appointments, or other activity, for example. Schedule information may also include information about recurrence of events, locations, and contact information pertinent to a given event, as well as names of events and remarks pertaining to a given event. An activity status may include whether a user is free or busy at a particular time, and may additionally include more specific states such as, but not limited to, the presence states described above. As described in greater detail below, calendar server 190 may interact with IM clients 100 to modify presence state information based on schedule data. Calendar server 190 may also interact directly with IM server 140 on behalf of a user. It is noted that in some embodiments, IM system 10 may omit calendar server 190 while including other modules and functions such as those illustrated in FIG. 1. Additionally, in some embodiments IM system 10 may incorporate the functionality of calendar server 190 into a different software module, such as IM server 140, for example.

It is noted that although the illustrated embodiment of IM system 10 depicts a web-based IM client application and a client-server IM system topology, alternative embodiments are contemplated in which different IM client application structures and different IM system topologies are employed. In one alternative embodiment, IM client 100 may be configured as a standalone application program rather than as a web-based application. In such an embodiment, IM client 100 may be invoked independently of web browser 110, without downloading application code such as IM resources 180 via web server 170. In another alternative embodiment, IM system 10 may be configured in a peer-to-peer topology rather than a client-server topology. In such an embodiment, the functions performed by IM server 140 as described above may be distributed among the IM clients 100 within the system. For example, rather than storing presence state information for users centrally within IM server 140 as in the client-server implementation, in one peer-to-peer embodiment a given IM client 100 may store presence state information for other IM clients 100 that are nearby (e.g., on the same portion of a network). In such a peer-to-peer embodiment, presence state changes and requests for presence state information may propagate from one IM client 100 to another. Further, in embodiments where the function of IM server 140 is distributed among IM clients 100, IM multiplexor 130 may be unnecessary. Other embodiments of IM system 10 are possible and contemplated, including combinations of the aforementioned embodiments.

It is also noted that in some embodiments, various combinations of software modules illustrated as distinct in FIG. 1 may be combined into one or more different software modules. It is further noted that the various software modules illustrated in FIG. 1 may operate within a varying number of computer systems in different embodiments. For example, in one embodiment, each software module of the illustrated embodiment of IM system 10 may operate within a single computer system. In another embodiment, each of IM server 140, directory server 150, SMTP server 160, and web server 170 may operate within a respective computer system, which systems may be interconnected via a communication network. Other such variations are possible and contemplated.

Figure 2:
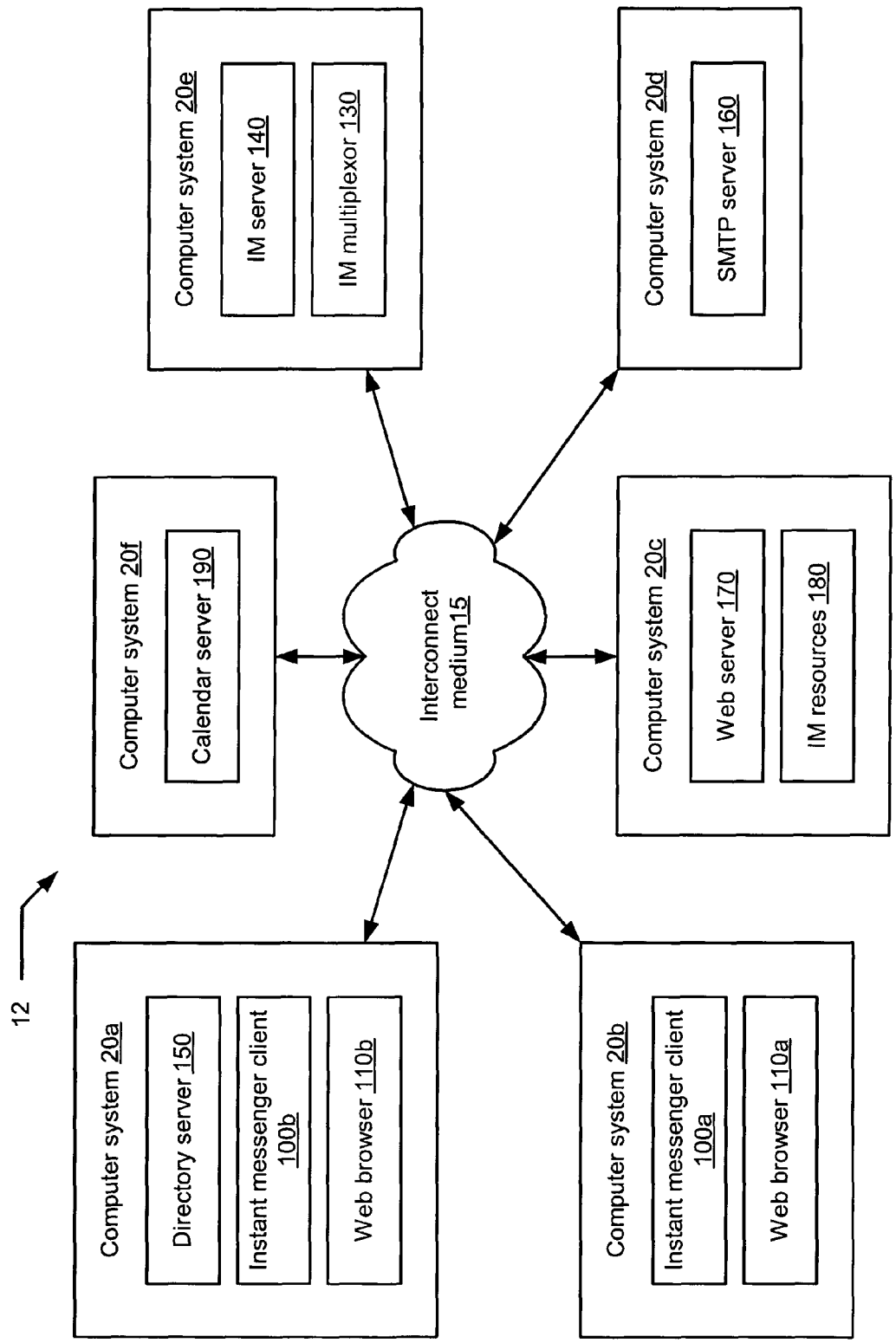
FIG. 2 is a block diagram illustrating one embodiment of a system configured to execute instant messaging system software modules.

Referring to FIG. 2, a block diagram illustrating one embodiment of a system configured to execute instant messaging system software modules. Elements corresponding to elements of FIG. 1 are numbered identically. System 12 includes a plurality of computer systems 20*a-f*, which collectively may be referred to as computer system 20. Each of computer systems 20*a-f* is coupled to interconnect medium 15.

Each computer system 20 may be configured to execute software code such as the software modules of IM system 10 illustrated in FIG. 1 and FIG. 2. Various embodiments of computer system 20 are described in greater detail below in conjunction with the description of FIG. 3. Interconnect medium 15 may be configured to transfer data among computer systems 20. In some embodiments, interconnect medium 15 may be a wired communications medium such as an Ethernet, fiber optic, or telephony network, for example. In other embodiments, interconnect medium 15 may be a wireless communications medium such as, for example, a wireless 802.11 local area network (LAN) or a wireless telephony network (e.g., a cellular, PCS, or GSM network). It is contemplated that in some embodiments interconnect medium 15 may include multiple types of communications media and may represent the Internet or an intranet.

In the illustrated embodiment, computer system 20*a* is configured to execute directory server 150 as well as web browser 100*b* and IM client 100*b*. Computer system 20*b* is configured to execute web browser 100*a* and IM client 100*a*. Computer system 20*c* is configured to execute web server 170 and to serve IM resources 180. Computer system 20*d* is configured to execute SMTP server 160. Computer system 20*e* is configured to execute IM multiplexor 130 and IM server 140, while computer system 20*f* is configured to execute calendar server 190. In the course of executing its respective software modules, each computer system 20 may communicate with other computer systems 20 to perform the various IM system operations described above. For instance, when a user of computer system 20*b* wishes to initiate an IM session, computer system 20*b* may communicate with computer system 20*c* so that web browser 110*a* may obtain IM resources 180 via web server 170. Additionally, computer system 20*b* may communicate with computer system 20*e* so that IM server 140 may authenticate and authorize the user. Computer system 20*e* may communicate with computer system 20*a* so that IM server 140 may obtain information regarding the user's identity from directory server 150.

It is noted that in alternative embodiments, the illustrated software modules may be distributed differently among computer systems 20. For example, server-type software modules may be configured to operate on a first set of one or more computer systems 20, while client-type software modules (e.g. IM client 100 and web browser 110) may be configured to operate on a second set of one or more computer systems that is distinct from the first set. Additionally, in some embodiments each software module may operate on a respective computer system 20, whereas in other embodiments multiple software modules may operate on a given computer system 20.

Instant Messaging System Hardware

Figure 3:
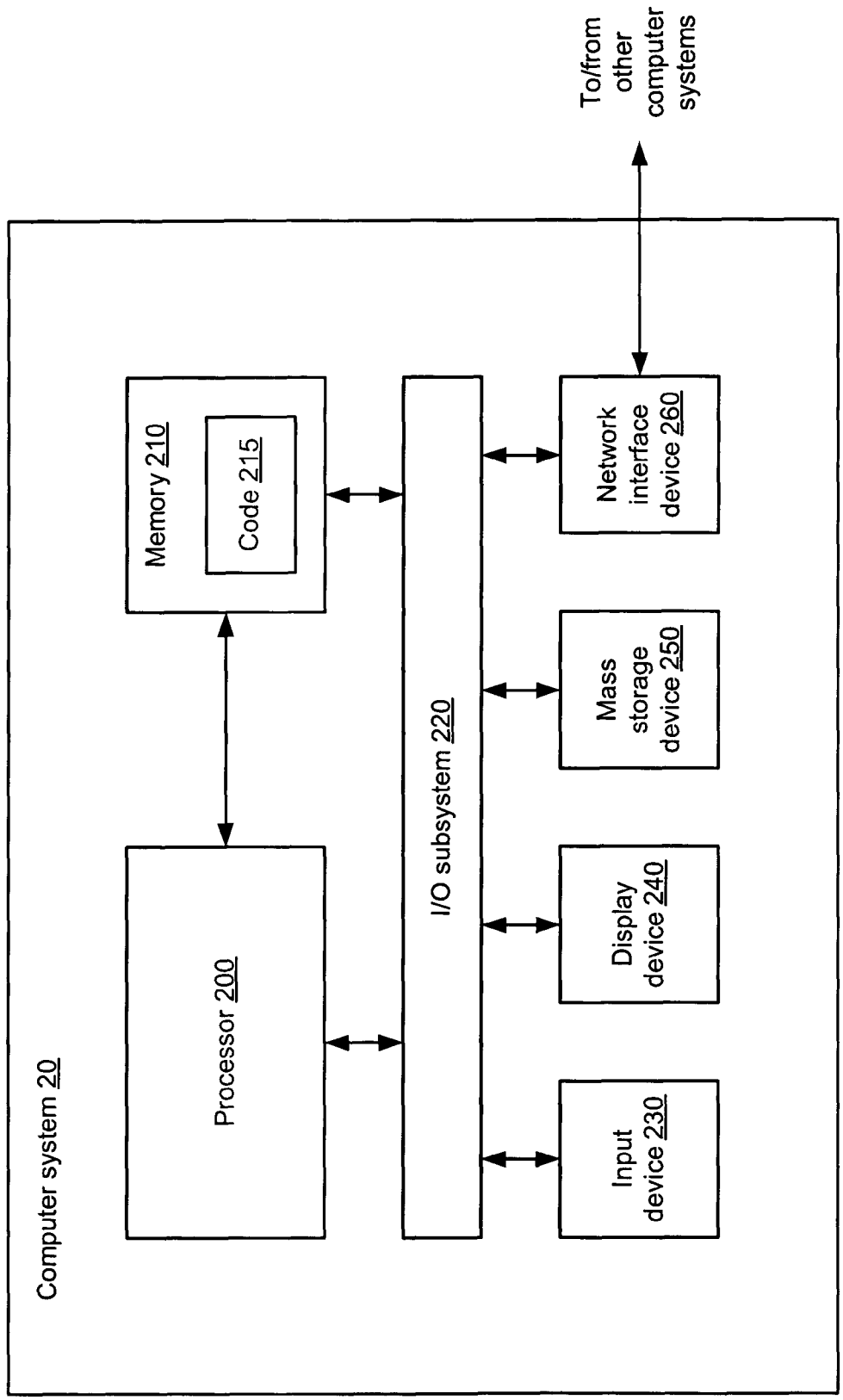
FIG. 3 is a block diagram of one embodiment of an exemplary computer system.

As noted above, the software modules comprising the illustrated embodiment of IM system 10 may be executed by one or more computer systems during operation of IM system 10. Referring to FIG. 3, a block diagram of one embodiment of an exemplary computer system is shown. In the illustrated embodiment, computer system 20 includes processor 200 coupled to memory 210. Both processor 200 and memory 210 are coupled to a variety of devices via input/output (I/O) subsystem 220, including input device 230, display device 240, mass storage device 250, and network interface device 260.

Processor 200 may be configured to execute program instructions stored in memory 210 or received via I/O subsystem 220. In one embodiment, processor 200 may be a microprocessor configured to implement a given instruction set architecture (ISA), such as the SPARC ISA or the x86 ISA, for example. In another embodiment, processor 200 may be a digital signal processor, while in still another embodiment, processor 200 may be an integrated device such as a microcontroller. In some embodiments, processor 200 may include an integrated memory controller (not shown) enabling it to couple directory to memory such as memory 210, whereas in other embodiments, processor 200 may couple to memory via a separate interface (e.g., a north bridge) or via I/O subsystem 220.

Memory 210 may be configured to store program instructions and data during operation of computer system 20. In various embodiments, memory 210 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or Rambus DRAM (RDRAM), for example. Memory 210 may also include nonvolatile memory technologies such as nonvolatile "flash" RAM (NVRAM) or read-only memory (ROM). In some embodiments, it is contemplated that memory 210 may include a combination of technologies such as the foregoing, as well as other technologies not specifically mentioned. In the illustrated embodiment, memory 210 includes software code 215, which may include program instructions and data corresponding to one or more of the software modules of IM system 10 of FIG. 1. Code 215 may also include program instructions and data corresponding to other application or operating system software modules.

I/O subsystem 220 may be configured to interface various peripheral devices to processor 200 and to memory 210. In one embodiment I/O subsystem 220 may include logic and interconnect devices configured to implement a bus interconnect standard such as the peripheral component interconnect (PCI) bus standard, although in other embodiments other bus interconnect types or a combination of such types may be supported. In some embodiments, I/O subsystem 220 may include logic configured to support direct memory access (DMA) transfers between peripheral devices and memory 210.

Input device 230 may be configured to receive input from one or more users of computer system 20 and to deliver such input to processor 200 and/or memory 210 via I/O subsystem 220. For example, in one embodiment input device 230 may include tactile input devices such as a computer keyboard, a computer mouse, or a stylus/touchpad interface. Additionally, in one embodiment input device 230 may include video or audio input devices such as a video camera, a still camera, or a microphone, for example. In some embodiments, it is contemplated that input device 230 may include more than one input device, including other types of input devices. Input device 230 may also include hardware necessary to convert the format of the input data to the format required by computer system 20. For example, input device 230 may include analog-to-digital processing hardware to convert audio or video input to a digital format.

Display device 240 may be configured to display output of computer system 20 to one or more users. For example, in one embodiment display device 240 may include a video display terminal such as a computer monitor or a liquid crystal display (LCD) screen, as well as a graphics processor configured to convert output data from the format produced by processor 200 to the format required by the display device. Display device 240 may also include audio output hardware or other output devices such as printers or plotters. In some embodiments, it is contemplated that display device 240 may include more then one display device, including other types of display devices. Further, in some embodiments a given device such as a touch screen, for example, may function as both an input device and a display device.

Mass storage device 250 may be configured to store data, including program instructions and data, for use during operation of computer system 20. In one embodiment, mass storage device 250 may be both readable and writable, and may thereby be configured to store data produced by computer system 20 or received from input device 230 or another computer system. For example, mass storage device 250 may include a magnetic storage device such as a fixed disk drive (also referred to as a hard drive or hard disk), a removable magnetic disk drive, or a tape drive. Mass storage device 250 may also include a rewritable optical storage device such as a recordable or rewritable compact disk (CD-R or CD-RW) or a recordable digital video disk (DVD), for example. In other embodiments, mass storage device 250 may be a read-only optical device such as a CD-ROM or DVD-ROM. In still other embodiments, mass storage device 250 may be a solid-state storage device such as a removable flash RAM device, for example. In some embodiments, it is contemplated that optional mass storage device 250 may include more than one storage device, including other types of storage devices.

Network interface device 260 may be configured to transmit data from computer system 20 to other computer systems as well as to receive data from other computer systems via a communication network. In one embodiment, network interface device 260 may be physically coupled to one or more other computer systems and may implement a networking standard such as Ethernet, for example. Alternatively, network interface device 260 may implement a fiber optic communication network protocol, or it may implement a telephony protocol and function as a dial-up modem, for example. In another embodiment, network interface device 260 may use a wireless networking protocol to interface with one or more other computer systems, such as a wireless Ethernet protocol (e.g., Wi-Fi), the Bluetooth standard, or a wireless telephony standard. In some embodiments, it is contemplated that network interface device 260 may include more than one network interface implementing more than one type of interface protocol, including other types of devices and protocols.

It is noted that in some embodiments of computer system 20, functions of various elements depicted in the embodiment of FIG. 1 may be integrated into a single element. For example, in one embodiment, a microcontroller may integrate some or all of the functions of processor 200, memory 210, and I/O subsystem 220. Alternatively, as noted above, in one embodiment input device 230 and display device 240 may be integrated into a single device, for example. Further, it is noted that in some embodiments, computer system 20 may omit one or more of input device 230, display device 240, mass storage device 250, and network interface device 260.

Various embodiments of computer system 20 may correspond to various types of well-known computing devices, depending on the configuration of the various components of computer system 20. For example, an embodiment of computer system 20 that includes a high-performance processor 200, a large quantity of memory 210, a large quantity of hard disk storage as mass storage device 250, and a high-bandwidth network interface device 260 may be configured to operate as a server computer system. Such a server computer system may further be configured to execute the server software modules of the IM system 10 embodiment illustrated in FIG. 1, as well as other software modules of IM system 10.

In other embodiments, computer system 20 may be a desktop or portable computer system or a tablet computer system. A personal digital assistant (PDA) may be an embodiment of computer system 20 configured, for example, to include a touch screen and/or a voice recognition interface as input device 230, a low-power-consumption processor 200, flash NVRAM as memory 210, and a wireless Ethernet interface (e.g., implementing the 802.11 "Wi-Fi" standard) as network interface device 260. A wireless telephony device may also be an embodiment of computer system 20. Various embodiments of such wireless telephony devices may include, for example, an analog or digital "cellular" telephone device implementing a wireless telephony standard such as GSM, TDMA, CDMA, or another standard. The aforementioned embodiments may be configured to execute software modules of the IM system 10 embodiment illustrated in FIG. 1 such as IM client 100 and/or web browser 110, as well as other software modules of IM system 10. It is noted that numerous other embodiments of computer system 20 are possible and contemplated.

As noted above, in some embodiments code 215 may correspond to one or more of the software modules of IM system 10 illustrated in FIG. 1. In the illustrated embodiment of computer system 20, code 215 resides in memory 210. Memory 210 may be one embodiment of a computer-accessible medium configured to store program instructions and/or data such as included in code 215. However, in other embodiments, the program instructions and/or data included in code 215 may be received, sent or stored upon different types of computer-accessible media. Generally speaking, a computer-accessible medium may include storage media or memory media such as magnetic or optical media, e.g., disk or CD-ROM included in some embodiments of computer system 20 as mass storage device 250. A computer-accessible medium may also include volatile or non-volatile media such as RAM (e.g. SDRAM, DDR SDRAM, RDRAM, SRAM, etc.), ROM, etc, that may be included in some embodiments of computer system 20 as memory 210. Further, a computer-accessible medium may include transmission media or signals such as electrical, electromagnetic, or digital signals, conveyed via a communication medium such as network and/or a wireless link, which may be included in some embodiments of computer system 20 as network interface device 260.

Changing Instant Messenger Presence State Based on Busy Detection

As described above, in some embodiments, IM system users may manually change the presence state associated with their respective IM clients to reflect an "away" presence status. For example, upon commencing a particular work activity, users may wish to indicate that they are unavailable to participate in instant messaging operations. Such users may then manually transition the presence state associated with their respective IM clients to an "away" presence state. The "away" presence state of such users may then be viewed by other IM system users.

In some embodiments, the presence state of an IM system user may be automatically transitioned to a busy state depending on some criterion. It is noted that in some embodiments, a busy presence state may be any IM presence state designated to represent busy status information. In one embodiment, a busy presence state may be a custom presence state defined by a given IM system user, such as "leave me alone," for example.

In one embodiment, whether or not a given IM system user is busy may be associated with the activity of that user's computer system. For example, a high level of activity of input device 230, such as keyboard or mouse activity, may indicate that a given user of computer system 20 is busy and that the presence state of that user should be transitioned to a busy state. Similarly, for example, if such a high level of activity is followed by a lower level of activity, this may indicate that the user is no longer busy and that the presence state of the user should be transitioned to an online state. It is noted that in some embodiments, an online presence state may be any IM presence state designated to represent online status information, where online status may represent a lower level of activity than that corresponding to a busy state. In one embodiment, an online presence state may be a custom presence state defined by a given IM system user, such as "I'm free," for example. Alternatively, if a high level of activity is followed by no activity, this may indicate that the user is no longer busy and that the presence state of the user should be transitioned to an idle state. It is noted that in some embodiments, an idle presence state may be any IM presence state designated to represent idle status information, and in one embodiment, an idle presence state may be a custom presence state defined by a given IM system user.

In one embodiment, a software module of IM system 10 of FIG. 1, such as IM client 100, for example, may be configured to detect a computer system activity level, to determine whether that activity level exceeds an activity threshold, and to transition the presence state corresponding to a given user to a busy state in response to determining that the activity level exceeds the activity threshold. It is noted that in some embodiments, the computer system activity detected may occur on a computer system different from the one executing the software module configured to perform the detection.

In one embodiment, the computer system activity level may be a metric corresponding to an aspect of activity of computer system 20. For example, in various embodiments, computer system activity may include keyboard activity, mouse activity, or processor utilization, and the corresponding computer system activity levels may be keyboard strokes per unit of time, mouse movements per unit of time, or the fraction of processor time spent performing operations other than idling, respectively. Processor utilization may further be segregated into utilization corresponding to foreground and background software processes, where in one embodiment, foreground software processes include processes a user is directly interacting with and background software processes include processes a user is not directly interacting with (such as batch jobs, for example). In one embodiment, computer system activity may also include instant messaging operations, such as chat sessions, where the corresponding activity level may include the number of simultaneous chat sessions a given user is participating in, for example. In other embodiments, other types and levels of computer system activity may be detected. It is noted that in some embodiments, the computer system activity to be detected may be configurable by a user. For example, a given user of IM client 100 may determine that the relevant computer system activities to be considered when determining whether to transition to a busy presence state include keyboard activity and processor utilization, but not mouse activity. The given user may then configure the appropriate activities to be detected, for example through a user interface provided by IM client 100.

In one embodiment, IM client 100 may be configured to compare the detected activity level to a corresponding activity threshold to determine whether the activity threshold has been exceeded. In one embodiment, IM client 100 may make this determination at a single point in time, whereas in another embodiment, IM client 100 may include a threshold time parameter corresponding to a given activity level and may require the activity level to exceed the activity threshold for at least the threshold time before determining that the activity threshold has been exceeded. In one embodiment, the various activity thresholds and corresponding threshold times may be parameters configurable by a user of IM client 100. For example, IM client 100 may provide a user interface through which a user may specify which activities are to be detected, as well as what thresholds correspond to the specified activities. As a specific example, a user may select that keyboard activity should be detected with an activity threshold of 50 keystrokes per minute and a threshold time of three minutes and that foreground processor utilization should be detected with an activity threshold of 60% and a threshold time of five minutes.

In one embodiment, IM client 100 may be configured to transition the presence state corresponding to a given user to a busy state in response to determining that the detected activity level exceeds the corresponding activity threshold. In such an embodiment, IM client 100 may further be configured to determine whether the detected activity level does not exceed the corresponding activity threshold and to transition the presence state to an online state in response to this determination. In one embodiment, IM client 100 may further be configured to determine whether no activity has been detected and to transition the presence state to an idle state in response to this determination. IM client 100 may employ respective threshold times for online state determination and idle state determination that in various embodiments may be the same parameters as that used for busy determination, or separate parameters.

It is noted that although in one embodiment, busy status detection and corresponding presence state transitioning have been described as aspects of IM client 100, in other embodiments, it is contemplated that these functions may be implemented in other software modules of IM system 10 in various embodiments as noted above. It is further noted that in some embodiments, these functions may be implemented as program instructions and/or data of a computer-accessible medium as described above.

Figure 4A:
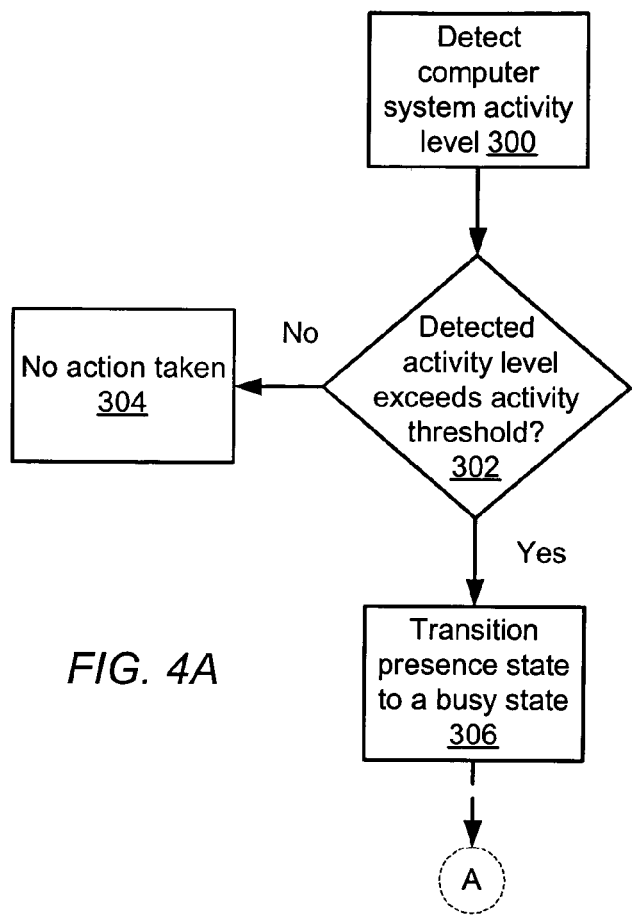
FIG. 4A is a flow diagram illustrating the operation of one embodiment of an instant messaging system during processing of presence state using computer system activity information.

FIG. 4A is a flow diagram illustrating the operation of one embodiment of an instant messaging system during processing of presence state using computer system activity information. Operation begins in block 300, where a computer system activity level indicative of computer system activity is detected. In one embodiment, a software module such as IM client 100 of FIG. 1, for example, may be configured to perform computer system activity level detection, as described above. Also, in one embodiment, the computer system exhibiting the detected activity may be a system such as computer system 20 of FIG. 3. In various embodiments, the types and levels of computer system activity detected may be those described above, including, for example, keyboard, mouse, processor (including foreground and background process activity), and instant messaging operation activity. Additionally, as noted above, the computer system activity detected may be configurable by a user.

In response to detecting computer system activity, the instant messaging system may determine whether the detected activity level exceeds an activity threshold (block 302). Activity threshold types may be as described above, and in some embodiments may be configurable by a user. In one embodiment, determining whether the detected activity level exceeds an activity threshold may include determining whether the duration of the detected level of activity exceeds a threshold time. In some embodiments, as noted above, the threshold time may be configurable by a user.

In response to determining whether the detected activity level exceeds an activity threshold, if the threshold is not exceeded, no action may be taken (block 304). If the threshold is exceeded, the instant messaging system may transition the presence state corresponding to a given user to a busy state (block 306). In another embodiment, operation may optionally continue from block 306, as described below.

Figure 4B:
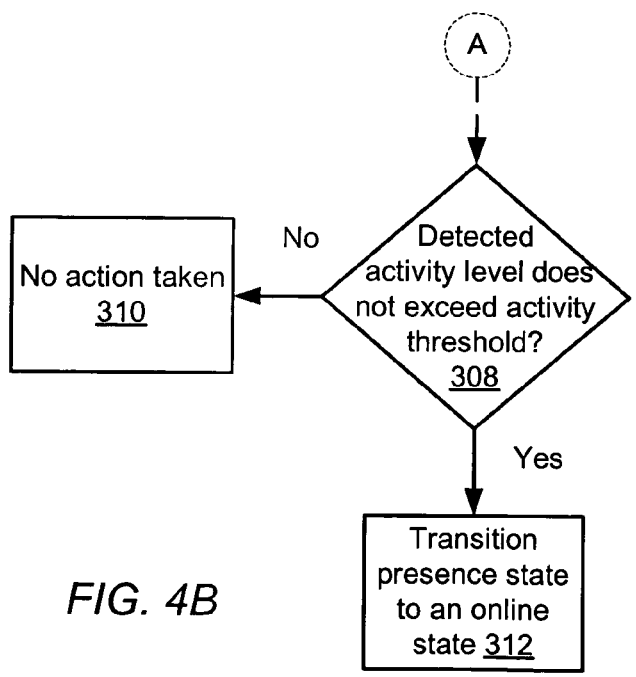
FIG. 4B is a flow diagram illustrating the operation of a second embodiment of an instant messaging system during processing of presence state using computer system activity information.

FIG. 4B is a flow diagram illustrating the operation of a second embodiment of an instant messaging system during processing of presence state using computer system activity information. The operation illustrated in FIG. 4B represents a continuation of the operation illustrated in FIG. 4A. Specifically, operation begins subsequent to block 306 of FIG. 4A, where the instant messaging system has transitioned the presence state corresponding to a given user to a busy state. In block 308, subsequent to transitioning the presence state to the busy state, the instant messaging system may determine whether the detected activity level does not exceed the activity threshold. In one embodiment, determining whether the detected activity level does not exceed an activity threshold may include determining whether the duration of the detected level of activity exceeds a threshold time, which time may be the same value as or a different value from the time referred to in block 302 of FIG. 4A. In an alternative embodiment, the instant messaging system may distinguish between whether the detected activity level does not exceed an activity threshold and whether no activity is detected.

In response to determining whether the detected activity level does not exceed an activity threshold, if the threshold is exceeded, no action may be taken (block 310). If the threshold is not exceeded, the instant messaging system may transition the presence state corresponding to a given user to an online state (block 312). In an alternative embodiment in which the instant messaging system distinguishes between whether the detected activity level does not exceed an activity threshold and whether no activity has been detected, the instant messaging system may transition the presence state corresponding to a given user to an idle state in response to determining that no activity has been detected.

Changing Instant Messenger Presence State Based on Schedule Information

As described above, in some embodiments IM system users may manually select a busy presence state, or such a presence state may be assigned by a respective IM client without a user's intervention in response to detecting various types of computer system activity. In addition to these techniques for changing presence state to a busy presence state, in some embodiments IM system users may manually select their presence state based on their schedule information. For example, at the beginning or end of a scheduled event such as a meeting, users may wish to indicate their activity status to others via their presence state. Such users may then manually transition the presence state associated with their respective IM clients to a presence state indicative of their activity status, such as "engaged," "in a meeting," "away from my desk," or "available," for example. In some embodiments, users may define custom presence states indicative of specific activity status information, such as "in the weekly sales meeting," for example.

In one embodiment, the presence state of an IM system user may be automatically transitioned to a presence state corresponding to a given activity status depending upon that user's schedule information. For example, if a user stores schedule information in a calendar application accessible by the IM system, in one embodiment, the stored schedule information may be used to transition that user's presence state as his or her activity status, as indicated by the stored schedule information, changes throughout the day.

In one embodiment, a software module of IM system 10 of FIG. 1, such as calendar server 190, for example, may be configured to store schedule information indicative of the activity status of corresponding users of IM system 10. Additionally, a software module of IM system 10 such as IM client 100, for example, may be configured to query the schedule information and to assign a presence state corresponding to the activity status indicated by a given user's schedule information, if the current presence state of that user does not so correspond.

In one embodiment, calendar server 190 may be a calendar application program configured to store schedule information indicative of a user's activity status. For example, calendar server 190 may be configured to store start and end times of various scheduled events occurring throughout a user's day. In some embodiments, calendar server 190 may also be configured to store additional information regarding scheduled events such as the name of the event, its location, and the identities of other attendees, for example. In some embodiments, calendar server 190 may make a given user's schedule information visible to other users for reading and/or modification. For example, calendar server 190 may allow one user to add events to another's schedule information, such as when scheduling a meeting. In some embodiments, calendar server 190 may require authentication and authorization of a given user prior to allowing the given user to access his or her own schedule information or the schedule information of another user. In such embodiments, authentication and authorization may be performed directly by calendar server 190 or by another module of IM system 10 such as IM server 140, for example. Further, in some embodiments directory server 150 may be employed to assist in authentication and authorization of users of calendar server 190 in a manner similar to that described above for the general case of IM user authentication.

In one embodiment, calendar server 190 may be configured to respond to queries for schedule information corresponding to a given user, thereby making schedule information available to other applications. In one embodiment, calendar server 190 may be compliant with the Internet Calendaring and Scheduling Core Object Specification (also referred to as RFC (Request for Comments) 2445), a standard specifying a format for data exchange with calendar applications, although in other embodiments, a different standard for data exchange may be employed. In one embodiment, calendar server 190 may be accessible for queries as a web application via a uniform resource locator (URL) or "web address," although in other embodiments, calendar server 190 may be accessible via a different interface.

In response to a query for schedule information of a given user, in one embodiment calendar server 190 may return an indication of free (i.e., available) or busy (i.e., engaged) activity status of that user. For example, if there is any scheduled event at the time specified in the query, calendar server 190 may return an indication of engaged activity status. Otherwise, calendar server 190 may return an indication of available activity status. In another embodiment, calendar server 190 may return more details about a given user's schedule information instead of or in addition to an indication of available or engaged activity status. For example, if there is any scheduled event at the time specified in the query, calendar server 190 may return the name of the event, its location (if known), and its duration.

In one embodiment, a given IM client 100 may be configured to query calendar server 190 for the schedule information corresponding to the user associated with the given IM client 100. The activity status indicated by the schedule information returned by calendar server 190 may not correspond with the current presence state of the user associated with the given IM client 100. If the current presence state does not correspond to the indicated activity status, in one embodiment, IM client 100 may be configured to assign a different presence state that does correspond to the indicated activity status. For example, the current presence state of the user may be idle or online, but at the queried time, a scheduled meeting may have begun, and calendar server 190 may have returned an engaged activity status. Correspondingly, IM client 100 may assign an engaged presence state in response to the schedule query. Conversely, the current presence state of the user may be engaged, but at the queried time, a scheduled meeting may have ended, and calendar server 190 may have returned an available activity status. Correspondingly, IM client 100 may assign an idle or online presence state in response to the schedule query. Alternatively, IM client 100 may store the presence state of the user prior to the beginning of a scheduled event, and may return the presence state of the user to the stored state after the scheduled event ends.

In an alternative embodiment, calendar server 190 may return more detailed schedule information instead of or in addition to an indication of available or engaged activity status, as described above. In such an embodiment, if the current presence state does not correspond to the indicated activity status, IM client 100 may be configured to assign a different presence state determined by the schedule information returned by calendar server 190 in response to the query. For example, prior to querying calendar server 190, IM client 100 may indicate that the current presence state of the user is online. If at the queried time, the weekly sales meeting has begun, calendar server 190 may return the event title "weekly sales meeting" and a specific event end time, or other similar indications, in response to the schedule query. In response, IM client 100 may assign a presence state specific to the returned schedule information, such as "at weekly sales meeting" or "back at <end time>" where <end time> represents the event end time returned by calendar server 190.

In one embodiment, IM client 100 may query calendar server 190 for a given user's schedule information periodically or aperiodically, using the current time at the time of each query as the basis for the query. Depending on the interval between queries, such an embodiment may approximate real-time synchronization of IM client 100 with calendar server 190. In an alternative embodiment, IM client 100 may at a given time make multiple queries of calendar server 190, each query for a different time. IM client 100 may then queue the query results internally and monitor the queue for activity status changes as current time progresses. Such an embodiment may enable IM client 100 to retain an indication of pending schedule information in case calendar server 190 is not continuously accessible, for example if the user disconnects a portable computer system from the network that provides access to calendar server 190 on a different computer system. In still another alternative embodiment, calendar server 190 may be configured to initiate a query of schedule information for a given user and to send the results of the query to the appropriate IM client 100 without waiting for a query to originate from IM client 100.

It is noted that although in one embodiment, storage of schedule information and assignment of presence state based on such schedule information have been described as aspects of calendar server 190 and IM client 100 respectively, in other embodiments, it is contemplated that these functions may be implemented in other software modules of IM system 10 in various embodiments as noted above. For example, in one embodiment IM server 140 may interact directly with calendar server 190 to store a queue of schedule information on behalf of a given IM client 100. It is also contemplated that in one embodiment, these functions may be combined in a single software module. It is further contemplated that in some embodiments, these functions may be implemented as program instructions and/or data of a computer-accessible medium as described above.

Figure 5:
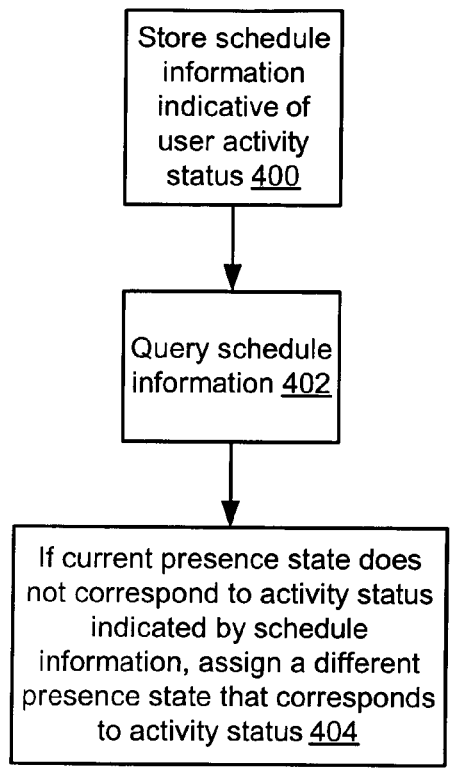
FIG. 5 is a flow diagram illustrating the operation of one embodiment of an instant messaging system during processing of presence state using schedule information.

FIG. 5 is a flow diagram illustrating the operation of one embodiment of an instant messaging system during processing of presence state using schedule information. Operation begins in block 400, where schedule information corresponding to a given user and indicative of that user's activity status at a given time is stored. In one embodiment, a software module such as calendar server 190 of FIG. 1, for example, may be configured to store such schedule information, as described above. In various embodiments, the schedule information stored may be as described above, including, for example, a user identity, an event title, an event location, and event start and end times.

In block 402, the stored schedule information is queried. In one embodiment, a software module such as IM client 100 of FIG. 1, for example, may be configured to query such stored schedule information, as described above. In another embodiment, a common software module may be configured to both store and query schedule information corresponding to a given user. Also, in one embodiment, calendar server 190 and IM client 100 may be configured to execute on one or more computer systems such as computer system 20 of FIG. 3.

In block 404, in response to the schedule information query, if the current presence state of IM client 100 does not correspond to the activity status indicated by the schedule information for the given user, IM client 100 may assign a different presence state that corresponds to the activity status for the given user. As described above, in one embodiment, the current presence state may be transitioned to an engaged state in response to detecting an engaged activity status of the given user, and the current presence state may be transitioned to an online state in response to detecting an available activity status of the given user. In another embodiment, the current presence state may be transitioned to a state determined by the schedule information of the given user. For example, the schedule information may indicate an event title or location, and in one embodiment IM client may assign a corresponding presence state that includes some or all of such schedule information.

Linking Instant Messaging Operations to Presence State

The foregoing description illustrates how, in various embodiments, the presence state of an IM system user may be changed without that user's intervention based on such factors as computer system activity and user schedule information, for example. Even with these features, however, in some embodiments presence states and presence state transitions may function only as advisory indications. That is, the presence state of a given user may indicate state information to other users, but may not modify other users' ability to engage in instant messaging operations with the given user. For example, if the given user's presence state changes to a busy state, either manually or without user intervention as described above, other users may not be prevented from sending alert operations or chat session requests to the given user despite the busy presence state. Additionally, in such embodiments, transitions from one presence state to another may have no particular significance in themselves, other than to advise that the given user's presence state has changed.

In one embodiment, instant messaging operations directed to a given user may operate selectively depending on the presence state of the user. For example, if a given user has a busy presence state, alert operations and chat session requests directed to the given user may be queued rather than delivered, thereby potentially eliminating the distraction of an instant messaging operation. In contrast, if the given user has an idle or online presence state, such alert operations and chat session requests may be processed and delivered normally. Additionally, in one embodiment, certain instant messenger operations may be associated with certain presence states for a given user, such that when the given user's presence state transitions to a new state, any instant messenger operations associated with the new state may be performed. For example, if a given user needs to perform a task before leaving on a particular day, an alert operation including a task reminder message may be scheduled for the particular day and associated with a "gone home" presence state. When the given user manually selects the "gone home" presence state, or alternatively when the user's calendar-based schedule information causes the "gone home" presence state to be selected as described above, the associated alert operation may be processed and delivered to the given user.

In one embodiment, a software module of IM system 10 of FIG. 1, such as IM client 100, for example, may be configured to receive an instant messaging operation directed to a given user, determine the presence state of the given user, and to selectively process the instant messaging operation dependent upon the presence. Additionally, in one embodiment a software module of IM system 10 of FIG. 1, such as IM client 100, for example, may be configured to store an instant messaging operation associated with a given presence state corresponding to a given user, detect a transition to the given presence state, and perform the instant messaging operation associated with the given presence state.

Processing Instant Messenger Operations Dependent on Presence State

In one embodiment, IM client 100 may be configured to receive an instant messaging operation directed to a given IM system user who is not offline. For example, a given IM client 100 may be configured to receive a chat, alert, or poll operation as described above, although in other embodiments it is contemplated that additional or different operations may be received. The operation may be directed to a user who is online in IM system 10, associated with the given IM client 100, and whose presence state as indicated by the given IM client 100 is other than an offline presence state. In response to receiving the instant messaging operation, IM client 100 may be configured to determine the presence state of the user. Specifically, IM client 100 may determine that the presence state of the user is an idle presence state, an online presence state, or another presence state that may be indicative of an idle user state. Likewise, IM client 100 may determine that the presence state of the user is a busy presence state or another presence state that may be indicative of a busy user state. As noted above, in one embodiment a presence state may indicate a user's presence or absence as well as available information regarding that user's activity status. A user's activity status may also be referred to herein as a user state, and various presence states may be grouped according to user states the presence states may indicate. For example, "available" may be a presence state indicative of an idle user state, and "engaged" and "away" may be presence states indicative of a busy user state.

As noted above, IM client 100 may be configured to selectively process the received operation dependent upon the presence state of the user. In one embodiment, IM client 100 may be configured to notify the user of the received operation if the presence state of the user is indicative of an idle user state. For example, if the user has an online presence state and receives an alert operation, the alert operation may be processed normally, and the user may receive whatever alert notification the alert operation, such as a visual or audible notification. In such an embodiment, IM client 100 may be further configured to queue the received operation without notifying the user if the presence state of the user is indicative of a busy user state. In the example above, if the user has an engaged presence state and receives an alert operation, the alert operation may be queued without notifying the user with a visual or audible notification. Alternatively, the usual notification associated with the received operation may be modified in this case, such as by displaying a visual or audible notification of reduced intensity. In another embodiment, IM client 100 may be configured to selectively queue the received operation depending on other information pertaining to the operation. For example, IM client 100 may be configured to queue operations originated from certain users, while allowing operations originating from other users to notify the busy user, thereby providing the capability for the busy user to "screen" incoming operations.

In one embodiment, if an instant messaging operation initiated by a second user is queued in response to a busy user state of the intended recipient as described above, IM client 100 associated with the intended recipient may be configured to notify the second user that the operation was queued. For example, a second user may attempt to initiate a chat operation with a user having an engaged presence state. The chat operation may be queued at the IM client 100 of the busy user, which may send the second user a notification that the intended target of the chat operation is busy and/or that the chat operation has been queued.

In another embodiment, IM client 100 may be configured to detect a transition from a presence state indicative of a busy user state to a presence state indicative of an idle user state, and in response, to notify the associated user of queued instant messaging operations. For example, a user may manually transition his or her presence state from an away state to an online state, or such a transition may occur based on computer system activity status or schedule information as described above. Once the user transitions to an online presence state, queued operations may be delivered, for example in the order they were queued.

It is noted that although in one embodiment, selective processing of instant messaging operations dependent upon a given user's presence state has been described as an aspect of IM client 100, in other embodiments, it is contemplated that this function may be implemented in other software modules of IM system 10 in various embodiments as noted above. It is further contemplated that in some embodiments, this function may be implemented as program instructions and/or data of a computer-accessible medium as described above.

Figure 6:
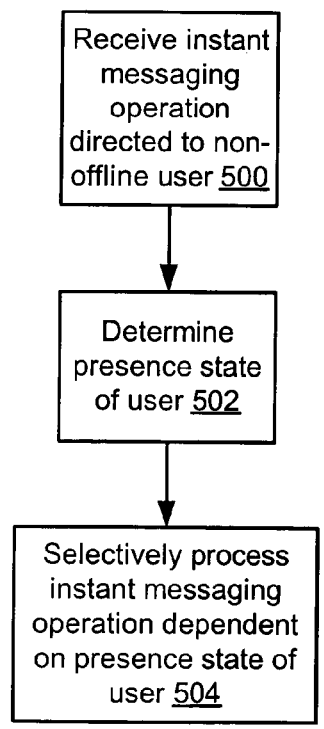
FIG. 6 is a flow diagram illustrating the operation of one embodiment of an instant messaging system during selective processing of instant messaging operations.

FIG. 6 is a flow diagram illustrating the operation of one embodiment of an instant messaging system during selective processing of instant messaging operations. Operation begins in block 500, where an instant messaging operation directed to a given user who is not offline is received. In one embodiment, a software module such as IM client 100 of FIG. 1, for example, may be configured to receive such an operation, as described above. In various embodiments, such an operation may include a chat operation, an alert operation, a poll operation, or another instant messenger operation.

In response to receiving the instant messaging operation, the presence state of the given user to whom the received operation is directed is determined (block 502). In one embodiment, IM client 100 may be configured to determine the presence state of the given user.

In response to determining the presence state of the given user, the received operation is selectively processed dependent upon the presence state (block 504). In one embodiment, IM client 100 may select a particular action to take in response to the received operation, as described above.

Figure 7:
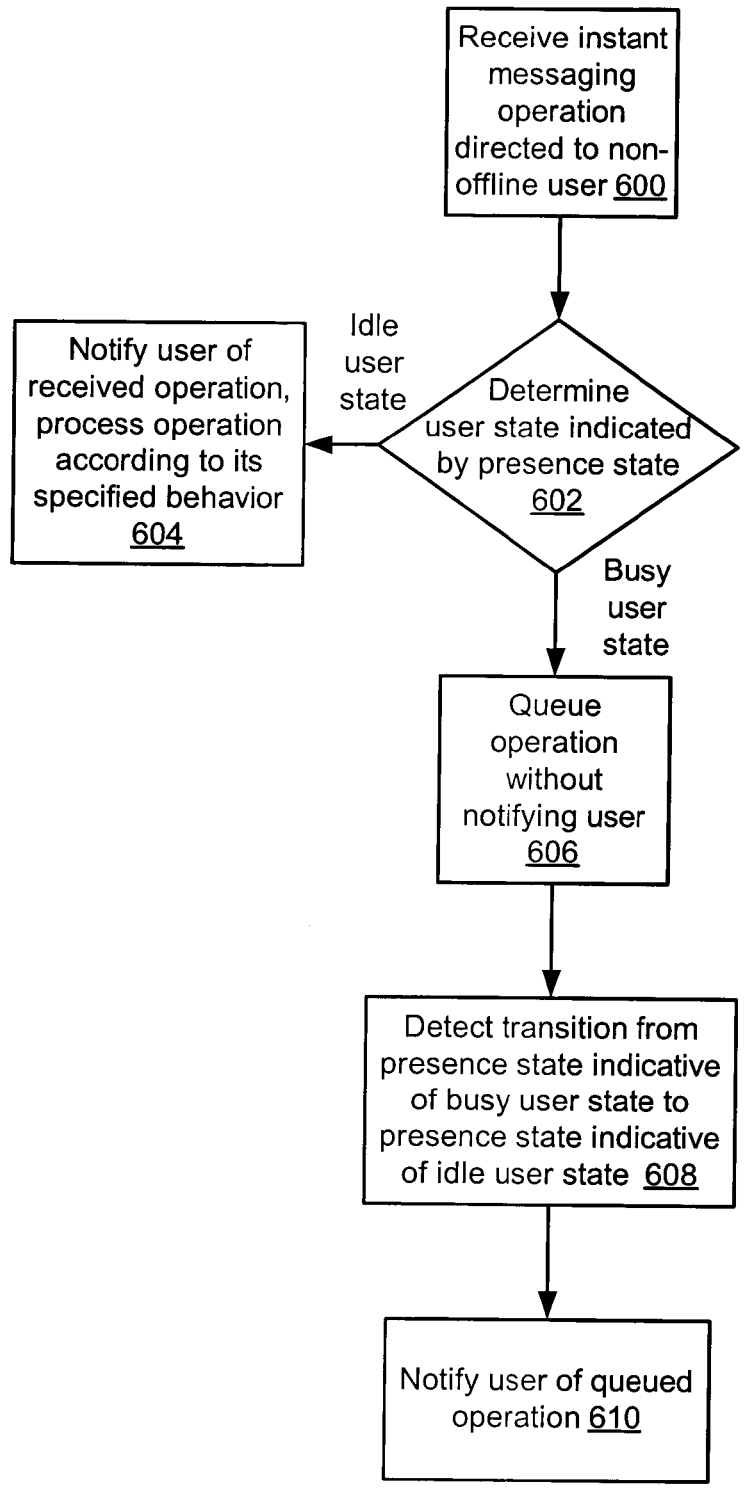
FIG. 7 is a flow diagram illustrating the operation of another embodiment of an instant messaging system during selective processing of instant messaging operations.

FIG. 7 is a flow diagram illustrating the operation of another embodiment of an instant messaging system during selective processing of instant messaging operations. Operation begins in block 600, where an instant messaging operation directed to a given user who is not offline is received. In one embodiment, a software module such as IM client 100 of FIG. 1, for example, may be configured to receive such an operation, as described above. In various embodiments, such an operation may include a chat operation, an alert operation, a poll operation, or another instant messenger operation.

In response to receiving the instant messaging operation, the presence state of the given user to whom the received operation is directed is determined (block 602). In one embodiment, IM client 100 may be configured to determine the presence state of the given user.

If the presence state of the given user is indicative of an idle user state, the given user may be notified of the received instant messaging operation, and the operation may be processed according to its specified behavior (block 604). For example, if the received operation is an alert operation, the given user may be notified of the alert operation.

If the present state of the given user is indicative of a busy user state, the received operation may be queued without notifying the given user (block 606). In one embodiment, IM client 100 may be configured to queue the received operation. In another embodiment, IM client 100 may be configured to notify a second user initiating the received operation of the queuing of the operation.

Subsequent to queuing of a received operation, a transition from a presence state indicative of a busy user state to a presence state indicative of an idle user state may be detected (block 608). In one embodiment, IM client 100 may be configured to detect such a transition.

In response to detecting such a transition, the given user may be notified of a queued instant messaging operation (block 610). In one embodiment, IM client 100 may be configured to notify the given user of queued operations, such as by delivering them in the order they were queued, for example.

Performing Instant Messenger Operations in Response to Presence State Changes

In one embodiment, IM client 100 may be configured to store an instant messaging operation associated with a given presence state corresponding to a given user. For example, IM client 100 may be configured to store a chat, alert, message or poll operation as described above, although in other embodiments it is contemplated that additional or different operations may be stored. The stored operation may be associated with a presence state such as an online presence state, for example. In one embodiment, IM client 100 may be configured to store sufficient information about the stored operation to enable the stored operation to be initiated. For example, if the stored operation is a chat operation, IM client 100 may store the identity of the user or the group of users to whom the chat operation is directed. In one embodiment, IM client 100 may maintain a plurality of queues in which to store instant messaging operations, with each queue associated with a respective presence state and configured to store operations associated with that presence state. For example, IM client 100 may maintain an online queue configured for storing operations associated with the online presence state, and a busy queue configured for storing operations associated with the busy presence state. In other embodiments, it is contemplated that the stored operations may be stored in different numbers and types of queues, or in data structures other than queues. Further, it is contemplated that in some embodiments another software module, such as IM server 140, may be configured to maintain and monitor queues or other data structures that store instant messaging operations associated with a particular presence state on behalf of a given IM client 100.

In one embodiment, IM client 100 may further be configured to detect a transition to a given presence state. For example, IM client 100 may detect a transition to an online presence state resulting from a user's manual selection or from processing computer system activity or schedule information without user intervention, as described above. In response to detecting the transition, in one embodiment IM client 100 may be configured to perform an instant messaging operation associated with the given presence state. For example, upon detecting a transition to an online presence state, IM client 100 may perform an operation stored in an online queue.

As a more specific example, a given user may wish to enter a particular chat session, such as a customer support chat session, whenever he or she is in an online presence state. The chat operation and information associated with the desired chat session, such as the identity of the customer support chat session, may be stored in the online queue of the given user's IM client 100. Upon detecting a transition to an online presence state, the given user's IM client 100 may perform the queued chat operation, taking whatever steps may be necessary to place the given user in the customer support chat session.

Performing instant messaging operations in response to presence state changes may also incorporate schedule information from calendar server 190 described above. For example, a given user may wish to receive an alert as a reminder of a relative's birthday the first time the given user's presence state changes to online on or after the birthday. (Alternatively, the given user may wish to send an alert to the relative as a birthday greeting under the same circumstances.) In one embodiment, calendar server 190 may maintain schedule information regarding the birthday event and may store the alert operation, an effective date before which the operation should not be performed, and associated information, such as the identity of the user who is to receive the alert, in the online queue of the given user's IM client 100 on behalf of that user. Upon detecting a transition to an online presence state, the given user's IM client 100 may check the effective date of the queued alert operation. If the current date is equal to or later than the effective date, the given user's IM client 100 may perform the queued alert operation. In alternative embodiments, the stored alert could be associated with other presence states, such as the idle state, for example.

It is noted that although in one embodiment, performing instant messaging operations in response to presence state changes has been described as an aspect of IM client 100, in other embodiments, it is contemplated that this function may be implemented in other software modules of IM system 10 in various embodiments as noted above. For example, this function may be implemented in IM server 140. It is further contemplated that in some embodiments, this function may be implemented as program instructions and/or data of a computer-accessible medium as described above.

Figure 8:
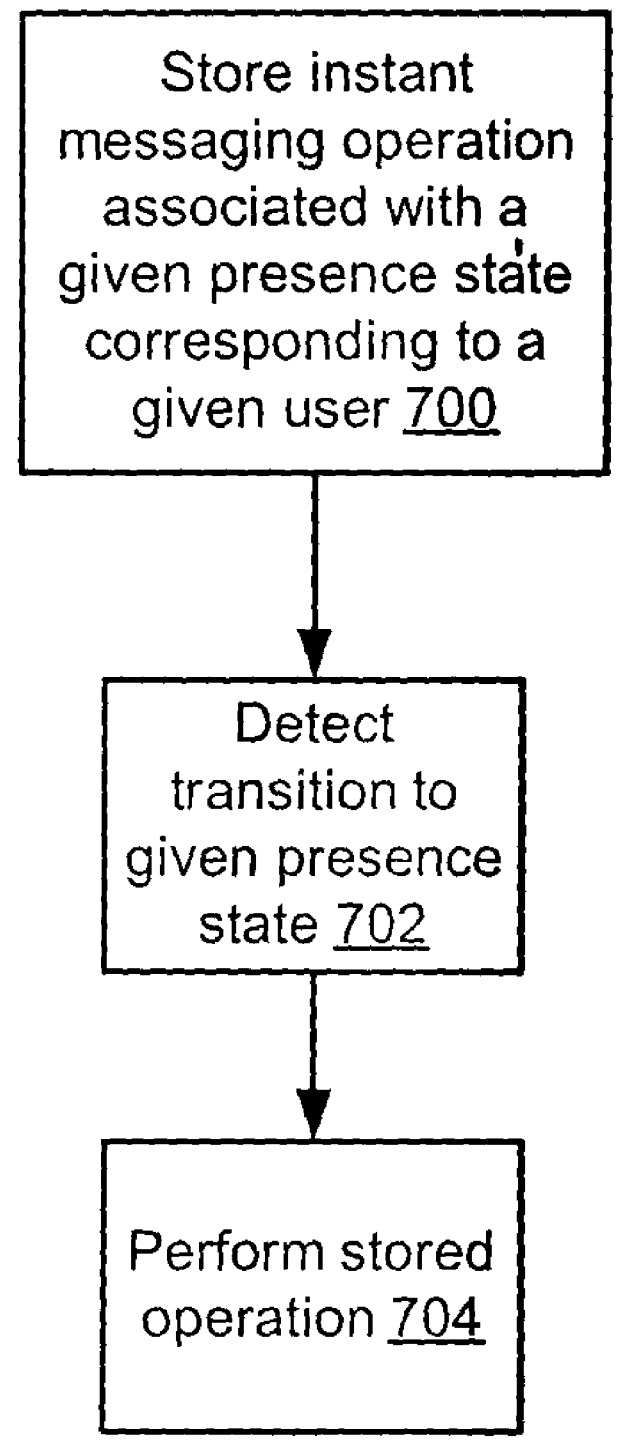
FIG. 8 is a flow diagram illustrating the operation of one embodiment of an instant messaging system during execution of instant messaging operations in response to presence state changes.

FIG. 8 is a flow diagram illustrating the operation of one embodiment of an instant messaging system during execution of instant messaging operations in response to presence state changes. Operation begins in block 700, where an instant messaging operation associated with a given presence state corresponding to a given user is stored. In one embodiment, a software module such as IM client 100 of FIG. 1, for example, may be configured to store such an operation, as described above. In various embodiments, such an operation may include a chat operation, an alert operation, a poll operation, or another instant messenger operation.

Subsequent to storing the instant messenger operation, a transition to the given presence state may be detected (block 702). For example, in one embodiment IM client 100 may be configured to store a chat operation in a queue associated with an online presence state, and may subsequently detect a transition to an online presence state.

In response to detecting a transition to the given presence state, the stored operation may be performed (block 704). Referring to the above example, in one embodiment IM client 100 may be configured to initiate the chat operation stored in queue associated with an online presence state in response to detecting a transition to an online presence state.

It is noted that alternative embodiments employing combinations and aspects of the foregoing features are possible and contemplated. For example, in one embodiment, modification of a given user's presence state based on computer system activity or schedule information may be combined with processing of instant messenger operations dependent on that user's presence state or performing instant messenger operations in response to presence state transitions. In some embodiments, such combinations of features may be implemented in several software modules such as those illustrated in the embodiment of IM system 10 of FIG. 1. In other embodiments, such combinations of features may be implemented in a single software module, for example IM client 100 of FIG. 1. In some embodiments, such combinations of features may be implemented as program instructions and/or data of a computer-accessible medium as described above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   determining, at a particular time, whether a current presence state of an instant messenger (IM) client corresponds to an activity status indicated by schedule information corresponding to a given user, wherein said current presence state indicates an IM presence status of said given user, wherein said schedule information is stored by a calendar application, and wherein said activity status includes a corresponding event title that is specifically descriptive of said given user's activity at said particular time; and
   in response to determining that the current presence state does not correspond to said activity status indicated by said schedule information, automatically assigning and storing a different presence state for said given user without intervention by said given user, such that subsequent to automatically assigning said different presence state to said given user, said different presence state is indicated by said instant messenger client as said given user's current presence state;

wherein said different presence state includes at least a portion of said corresponding event title included in said activity status, such that said different presence state indicated by said instant messenger client is descriptive of said given user's activity at said particular time according to said schedule information stored by said calendar application.

2. The method as recited in claim 1, wherein said calendar application is compliant with the Internet Calendaring and Scheduling Core Object Specification standard (RFC 2445).

3. The method as recited in claim 1, wherein said determining comprises accessing said calendar application via a uniform resource locator (URL).

4. The method as recited in claim 1, wherein assigning a different presence state comprises transitioning said current presence state to an engaged state in response to detecting a engaged activity status of said given user.

5. The method as recited in claim 1, wherein assigning a different presence state comprises transitioning said current presence state to an online state in response to detecting an available activity status of said given user.

6. The method as recited in claim 1, wherein assigning a different presence state comprises transitioning said current presence state to a state determined by said schedule information.

7. The method as recited in claim 1, further comprising:
detecting a computer system activity level indicative of computer system activity;
determining whether said activity level exceeds an activity threshold in response to said detecting; and
transitioning the presence state specific to said instant messenger client to a busy state in response to determining that said activity level exceeds said activity threshold, wherein said presence state corresponds to said given user.

8. The method as recited in claim 1, further comprising:
receiving an instant messaging operation directed to said given user, wherein said given user is not offline;
determining the presence state specific to said instant messenger client in response to receiving said instant messaging operation; and
selectively processing said instant messaging operation dependent upon said presence state in response to said determining.

9. The method as recited in claim 1, further comprising:
storing an instant messaging operation associated with a given presence state of said instant messenger client, wherein said given presence state corresponds to the given user;
detecting a transition to said given presence state subsequent to said storing; and
performing said instant messaging operation in response to said detecting.

10. The method as recited in claim 1, wherein said activity status corresponds to a scheduled event, and wherein the method further comprises:
storing said current presence state as a stored presence state prior to automatically assigning said different presence state; and in response to detecting that said scheduled event has ended, restoring said stored presence state such that subsequent to said restoring, said stored presence state is indicated by said instant messenger client as said given user's current presence state.

11. A computer-accessible storage medium, comprising program instructions, wherein the program instructions are computer-executable to:
determine, at a particular time, whether a current presence state of an instant messenger (IM) client corresponds to said an activity status indicated by schedule information corresponding to said given user, wherein said current presence state indicates an IM presence status of said given user, wherein said schedule information is stored by a calendar application, and wherein said activity status includes a corresponding event title that is specifically descriptive of said given user's activity at said particular time; and
in response to determining that the current presence state does not correspond to said activity status indicated by said schedule information, automatically assign and store a different presence state for said given user without intervention by said given user, such that subsequent to automatically assigning said different presence state to said given user, said different presence state is indicated by said instant messenger client as said given user's current presence state;
wherein said different presence state includes at least a portion of said corresponding event title included in said activity status, such that said different presence state indicated by said instant messenger client is descriptive of said given user's activity at said particular time according to said schedule information stored by said calendar application.

12. The computer-accessible medium as recited in claim 11, wherein said calendar application is compliant with the Internet Calendaring and Scheduling Core Object Specification standard (RFC 2445).

13. The computer-accessible medium as recited in claim 11, wherein to determine whether said current presence state corresponds to said activity status, the program instructions are further executable to access said calendar application via a uniform resource locator (URL).

14. The computer-accessible medium as recited in claim 11, wherein to assign a different presence state, the program instructions are further executable to transition said current presence state to an engaged state in response to detecting an engaged activity status of said given user.

15. The computer-accessible medium as recited in claim 11, wherein to assign a different presence state, the program instructions are further executable to transition said current presence state to an online state in response to detecting an available activity status of said given user.

16. The computer-accessible medium as recited in claim 11, wherein to assign a different presence state, the program instructions are further executable to transition said current presence state to a state determined by said schedule information.

17. The computer-accessible medium as recited in claim 11, wherein said program instructions are further computer-executable to:
detect a computer system activity level indicative of computer system activity;
determine whether said activity level exceeds an activity threshold in response to said detecting; and
transition the presence state specific to said instant messenger client to a busy state in response to determining that said activity level exceeds said activity threshold, wherein said presence state corresponds to the given user.

18. The computer-accessible medium as recited in claim 11, wherein said program instructions are further computer-executable to:
receive an instant messaging operation directed to said given user, wherein said given user is not offline;
determine the presence state specific to said instant messenger client in response to receiving said instant messaging operation; and
selectively process said instant messaging operation dependent upon said presence state in response to said determining.

19. The computer-accessible medium as recited in claim 11, wherein said program instructions are further computer-executable to:
store an instant messaging operation associated with a given presence state of said instant messenger client, wherein said given presence state corresponds to the given user;
detect a transition to said given presence state subsequent to said storing; and
perform said instant messaging operation in response to said detecting.

20. The computer-accessible storage medium as recited in claim 11, wherein the program instructions are further executable to:
store said current presence state as a stored presence state prior to automatically assigning said different presence state; and
in response to detecting that said scheduled event has ended, restore said stored presence state such that subsequent to being restored, said stored presence state is indicated by said instant messenger client as said given user's current presence state.

21. A system, comprising:
a computer system; and
computer-accessible storage comprising program instructions for an instant messenger software module configured to execute on said computer system; and
wherein said instant messenger software module is farther configured to:
determine, at a particular time, whether a current presence state of an instant messenger (IM) client corresponds to an activity status indicated by said schedule information corresponding to said given user, wherein said current presence state indicates an IM presence status of said given user, wherein said schedule information is stored by a calendar application software module, and wherein said activity status includes a corresponding event title that is specifically descriptive of said given user's activity at said particular time; and
in response to determining that the current presence state does not correspond to said activity status indicated by said schedule information, automatically assign and store a different presence state for said given user without intervention by said given user, such that subsequent to automatically assigning said different presence state to said given user, said different presence state is indicated by said instant messenger client as said given user's current presence state;
wherein said different presence state includes at least a portion of said corresponding event title included in said activity status, such that said different presence state indicated by said instant messenger client is descriptive of said given user's activity at said particular time according to said schedule information stored by said calendar application.

22. The system as recited in claim 21, wherein said calendar application software module and said instant messenger software module are integrated into a common software module.

23. The system as recited in claim 21, wherein said calendar application software module is compliant with the Internet Calendaring and Scheduling Core Object Specification standard (RFC 2445).

24. The system as recited in claim 21, wherein said instant messenger software module is further configured to access said calendar application software module via a uniform resource locator (URL).

25. The system as recited in claim 21, wherein to assign a different presence state, the instant messenger software module is further configured to transition said current presence state to an engaged state in response to detecting an engaged activity status of said given user.

26. The system as recited in claim 21, wherein to assign a different presence state, the instant messenger software module is further configured to transition said current presence state to an online state in response to detecting an available activity status of said given user.

27. The system as recited in claim 21, wherein to assign a different presence state, the instant messenger software module is further configured to transition said current presence state to a state determined by said schedule information.

28. The system as recited in claim 21, wherein said instant messenger software module is further configured to:
detect a computer system activity level indicative of computer system activity;
determine whether said activity level exceeds an activity threshold in response to said detecting; and
transition the presence state specific to said instant messenger software module to a busy state in response to determining that said activity level exceeds said activity threshold, wherein said presence state corresponds to a given user.

29. The system as recited in claim 21, wherein said instant messenger software module is further configured to:
receive an instant messaging operation directed to said given user, wherein said given user is not offline;
determine the presence state specific to said instant messenger software module in response to receiving said instant messaging operation; and
selectively process said instant messaging operation dependent upon said presence state in response to said determining.

30. The system as recited in claim 21, wherein said instant messenger software module is further configured to:
store an instant messaging operation associated with a given presence state of said instant messenger software module, wherein said given presence state corresponds to said given user;
detect a transition to said given presence state subsequent to said storing; and
perform said instant messaging operation in response to said detecting.

* * * * *